US006856723B1

(12) United States Patent
Ito et al.

(10) Patent No.: US 6,856,723 B1
(45) Date of Patent: Feb. 15, 2005

(54) GROUP VELOCITY DISPERSION MEASURING DEVICE AND GROUP VELOCITY DISPERSION MEASURING METHOD

(75) Inventors: Hiromasa Ito, Sendai (JP); Masato Yoshida, Sendai (JP); Koichiro Nakamura, Sendai (JP)

(73) Assignee: Japan Science and Technology Agency, Saitama (JP)

( * ) Notice: Subject to any disclaimer, the term of this patent is extended or adjusted under 35 U.S.C. 154(b) by 82 days.

(21) Appl. No.: 10/182,696

(22) PCT Filed: Sep. 22, 2000

(86) PCT No.: PCT/JP00/06508

§ 371 (c)(1),
(2), (4) Date: Oct. 8, 2002

(87) PCT Pub. No.: WO01/61302

PCT Pub. Date: Aug. 23, 2001

(30) Foreign Application Priority Data

Feb. 21, 2000 (JP) ........................................ 2000-042146

(51) Int. Cl.[7] ............................................... G02B 6/26
(52) U.S. Cl. .................................................... 385/27
(58) Field of Search ............................... 385/27, 7, 12, 385/39; 356/364, 73.1; 250/225; 359/305, 308, 237

(56) References Cited

U.S. PATENT DOCUMENTS

| 5,717,489 A | | 2/1998 | Ozeki et al. ................. 356/364 |
| 5,982,530 A | * | 11/1999 | Akiyama et al. ............ 359/279 |
| 5,995,228 A | | 11/1999 | Otani et al. .................. 356/364 |
| 6,266,145 B1 | * | 7/2001 | Lee et al. .................... 356/450 |

FOREIGN PATENT DOCUMENTS

| EP | 0 937 973 A2 | 2/1999 | |
| JP | 04-285836 | 10/1992 | |
| JP | 11-237312 | 8/1999 | |
| JP | 2000-081374 | 3/2000 | |
| JP | 2000193558 A | * 7/2000 | .......... G01M/11/02 |

OTHER PUBLICATIONS

Yoshida, M. "A new method for measurement of group velocity dispersion of optical fibers by using a frequency--shifted feedback fiber laser", IEEE Photonics Technology Letters, vol. 13, No. 3, Mar. 2001, pp. 227–229.*

Yoshida, M. et al., "Effect of group velocity dispersion of optical fiber on optical frequency domain reflectometry," Technical Digest, Summaries of Papers Presented at the Conference on Lasers and Electro–Optics, Postconference Edition, Cleo '99, Conference on Lasers and Electro–Optics (IEEE Cal. No. 99CH37013), pp. 388–389, XP002233307 1999, Washington, DC, Opt. Soc. America.

Namihira, "ITU–T Polarization Mode Dispersion (PMD) Round Robin Measurements for Optical Fibers and Components," KDD R&D No. 159 Mar. 1998, pp. 33–46.

* cited by examiner

Primary Examiner—Diane I. Lee
(74) Attorney, Agent, or Firm—Neifeld IP Law, PC (57) ABSTRACT

A group velocity dispersion measuring device capable of measuring group velocity dispersion (GVD) with a simple configuration and in a short time, comprising an FSF laser (FSFL) (2) for generating frequency chirp light, an optical amplifier (AMP) (3) for amplifying the frequency chirp light, an optical coupler (4), a circulator (5) for branch-controlling optical signals, a photodetector (6) for receiving a ray of light before and after its propagation through an optical fiber (1) to be measured, and an RF spectrum analyzer (RFSA) (7) for observing an optical spectrum waveform. Beat signals generated between chirp lights before and after the propagation, through the optical fiber (1) to be measured, of frequency chirp light emitted from the FSF laser (2) are alternately observed to calculate a GVD value from frequency differences between these beat signals.

13 Claims, 13 Drawing Sheets

CHIRPED FREQUENCY COMB CHARACTERISTICS OF OUTPUT OF FREQUENCY-SHIFTED FEEDBACK LASER

GROUP VELOCITY DISPERSION MEASURING DEVICE AND GROUP VELOCITY DISPERSION MEASURING METHOD

TECHNICAL FIELD

The present invention relates to group-velocity-dispersion measuring devices and group-velocity-dispersion measuring methods for measuring the group velocity dispersion of optical fibers.

BACKGROUND ART

In the field of long-distance optical communication, as the performance of optical communication systems has increased, management and control of the wavelength dispersion characteristics of optical fibers have become important issues.

Generally, optical fibers have a negative group velocity dispersion (GVD) in wavelength bands used for optical communication (for example, the 1.55 $\mu$m band). The GVD is one reason for the deterioration of the transmission characteristics of optical-pulse signals. Therefore, it is necessary to control and compensate for the dispersion characteristics of optical transmission paths, and it is very important to measure the total amount of dispersion of optical fibers.

One GVD measuring technique uses a variable-wavelength CW light source or pulsed light source to measure the wavelength dependency of the optical propagation time. In this technique, multiple-point measurement is employed with the use of wavelength as a parameter. This measurement takes a long time, and therefore it is difficult to control the GVD characteristics in real time.

The present inventors have previously proposed a new GVD measuring method which uses an optical frequency domain reflectometry (OFDR) method ("Optical-Fiber Group-Velocity-Dispersion Measurement Using Frequency-Shifted Feedback Laser" by Masato Yoshida, Toshiyuki Miyamoto, Takefumi Hara, Koichiro Nakamura, and Hiromasa Ito, in Technical Report of the Institute of Electronics, Information and Communication Engineers, OCS 98–103 (1999), 25). The present inventors have also proposed a GVD measuring device using a frequency-shifted feedback laser (FSF laser) as a frequency-chirped light source ("Automatic Group-Velocity-Dispersion Measuring System using Frequency-Shifted Feedback Fiber Laser" by Toshiyuki Miyamoto, Masato Yoshida, Takefumi Hara, Koichiro Nakamura, and Hiromasa Ito, in the Proceedings of Spring Conference of the Institute of Electronics, Information and Communication Engineers, C-3 (1999)).

The GVD measuring method which the present inventors have previously proposed directly calculates the GVD value of an optical transmission path according to the change in optical chirp rate during light propagation, and one feature is the short time required for measurement.

DISCLOSURE OF INVENTION

Figure 13:
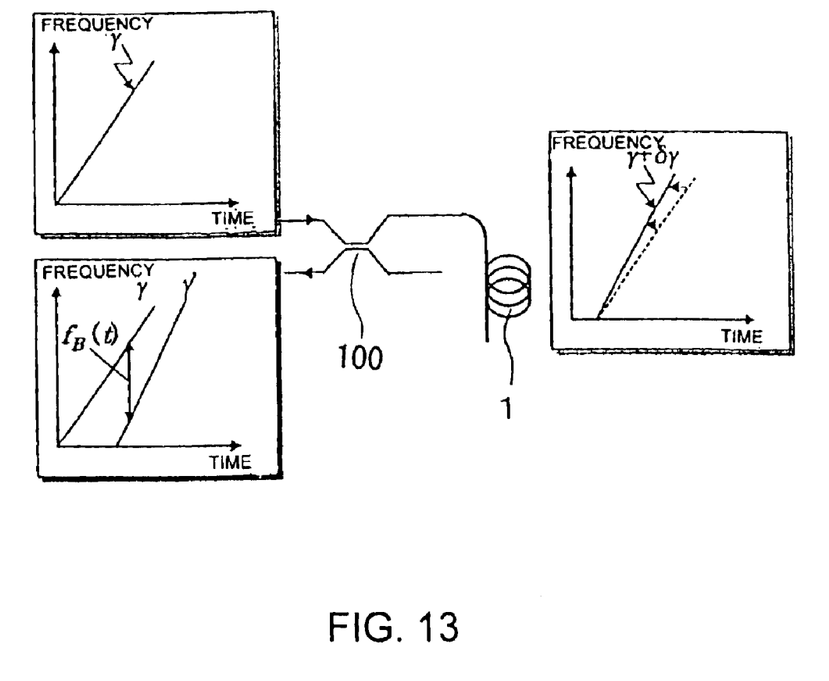
FIG. 13 is a typical view describing an overview of the GVD measurement method which the present inventors have previously proposed.

FIG. 13 is a typical view showing an outline of the GVD measuring method previously proposed by the present inventors. In the GVD measuring method shown in the figure, a self-delay heterodyne detection signal is to be measured. In this measuring method, frequency-chirped light emitted from an FSF laser propagates through an optical fiber 1 (to be measured) under test (FUT), and the spread of the spectrum of a beat signal is used to calculated the GVD value.

More specifically, a light source is connected to a first terminal, and photoelectric conversion means is connected to a second terminal at one end of optical branch means 100. The optical fiber under test 1 is connected to the terminal at the other end. Frequency-chirped light (measurement light) output from the light source is branched by the optical branch means 100 in two directions. One frequency-chirped light beam is incident on the optical fiber 1 under test. The chirp rate of the measurement light which propagates in the optical fiber 1 under test varies according to the effect of the wavelength dispersion of the optical fiber 1 under test. Light reflected from the output end or others of the optical fiber under test is emitted from the input end and received by the photoelectric conversion means through the optical branch means 100 to receive a beat signal. The received beat signal is used to calculate the GVD value.

In the above-described measuring method, however, a measurement error is large due to fluctuations in the length of the optical fiber under test, and therefore, the measurement accuracy is limited (to, for example, 0.36 ps/nm/km).

The present invention has been made in consideration of the foregoing points. An object of the present invention is to provide a group-velocity-dispersion measuring device and a group-velocity-dispersion measuring method which can measure the GVD with a simple configuration within a short time. In other words, an object of the present invention is to measure the GVD value at high speed in a short time by calculating the GVD value from the difference of the frequencies of the beat signals generated between multiple frequency-chirped light beams at equal frequency intervals, obtained before and after propagation through the optical fiber under test, compared with a conventional method in which measurement is performed at many points by the use of the wavelength of a measurement light source as a parameter.

Another object of the present invention is to use the OFDR method for a frequency-chirped light source in measurement to allow the measurement to be performed only at an input end of the optical fiber under test and also to allow the measurement to be easily applied to existing optical transmission networks. Further, still another object of the present invention is to improve the measurement accuracy by stabilizing the laser cavity, and extending the oscillated spectrum width.

To solve the above-described problems, according to first solving means of the present invention, a group-velocity-dispersion measuring device is provided, including
  chirped light generating means for generating at least two frequency-chirped light beams at a predetermined frequency interval, or multiple frequency-chirped light beams at equal frequency intervals;
  frequency-change-amount detecting means for detecting the frequency-change-amount of beat signals generated between chirped light beams obtained before and after the frequency-chirped light beams generated by the chirped light generating means propagate through an optical fiber under test; and
  group-velocity-dispersion detecting means for detecting the group-velocity-dispersion value of the optical fiber under test based on the amount of change detected by the frequency-change-amount detecting means.

According to second solving means of the present invention, a group-velocity-dispersion measuring method is provided, including a step of generating at least two frequency-chirped light beams at a predetermined frequency interval, or multiple frequency-chirped light beams at equal frequency intervals;

a step of propagating the frequency-chirped light beams, generated in the step of generating, through an optical fiber under test;

a step of detecting the amount of frequency change of the beat signals generated between chirped light beams obtained before and after propagation; and a step of detecting the group-velocity-dispersion value of the optical fiber under test based on the detected amount of change.

Further, in the present invention, since the change in frequency of the beat signals generated between multiple frequency-chirped light beams at equal frequency intervals, obtained before and after propagation through an optical fiber under test, is detected and the group velocity dispersion is obtained according to the result of that detection, the group velocity dispersion of the optical fiber under test can be measured simply and quickly. In addition, in the present invention, since the OFDR method is used for measurement, the measurement can be performed only at an input end of the optical fiber under test and can also be easily applied to existing optical transmission networks. Further, in the present invention, since the change in beat frequency is detected from the shift between the center frequencies of the frequency-chirped light beams obtained before and after propagation through the optical fiber under test, the change can be easily detected. Further, in the present invention, since the shift between center frequencies is detected by taking the results of multiple observations of the spectral profiles into consideration, the measurement error can be offset.

Further, in the present invention, since a frequency-shifting element is inserted into a ring cavity, and first diffraction light frequency-shifted by the Doppler effect is fed back, multiple frequency-chirped light beams at equal frequency intervals can be generated. In addition, in the present invention, a bandpass filter disposed in the ring cavity can tune the oscillated wavelength. Alternatively, in the present invention, an acousto-optic tunable filter (AOTF) can be used as a frequency-shifting element to electronically tune the oscillated wavelength by the driving frequency of the filter. Further, in the present invention, an all-fiber acousto-optic element using an optical fiber as a medium can be used as the frequency-shifting element, so that the measuring device has an all-fiber configuration. Furthermore, in the present invention, it is possible that frequency-chirped light whose oscillated frequency shifts with time is branched, a delay is applied to one light beam, and that light beam is coupled with the other light beam to generate multiple frequency-chirped light beams at equal frequency intervals.

BEST MODE FOR CARRYING OUT THE INVENTION

A group-velocity-dispersion measuring device and a group-velocity-dispersion measuring method according to the present invention will be specifically described with reference to the drawings. In the present invention, the GVD is measured mainly by using Optical Frequency Domain Reflectometry (OFDR).

First, the principle of the present invention will be described. When frequency-chirped light, whose frequency varies with time, propagates through an optical fiber, the chirp rate γ of the light changes due to the GVD effect of the optical fiber. The chirp rate is the speed at which the frequency of the light changes. The chirp rate γ' obtained after the light propagates through the optical fiber is given by the following expression:

$$\gamma' = \gamma + \frac{\lambda^2 DL\gamma^2/c}{1+\lambda^2 DL\gamma/c} \approx \gamma + \lambda^2 DL\gamma^2/c \quad (1)$$

where $\lambda^2\gamma^2 DL/c$ is the amount of change in the chirp rate, λ indicates the center wavelength of the frequency-chirped light source, D indicates the GVD value of the optical fiber, L indicates the optical fiber length, and c indicates the velocity of light. Expression (1) states that the GVD value of the optical fiber is directly measurable from the amount of change in the frequency chirp rate.

Figure 1:
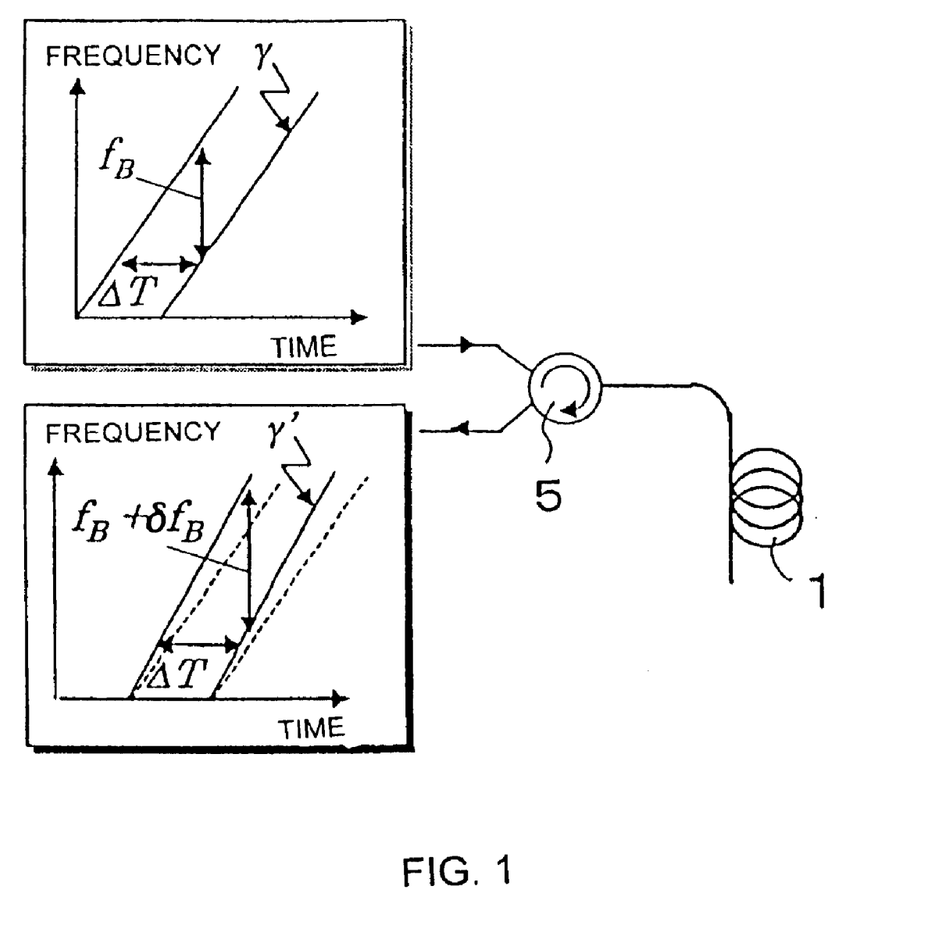
FIG. 1 is a view describing the principle of GVD measurement performed by a group-velocity-dispersion measuring device according to the present invention.

FIG. 1 is a diagram describing the principle of the GVD measurement in the group-velocity-dispersion measuring device according to the present invention. The GVD measuring method of the present invention employs an optical self-beat signal. In this measuring method, multiple frequency-chirped light beams having a time delay ΔT serve as light sources, and the center frequency of the beat signal generated between frequency components is to be measured.

More specifically, the light source is connected to a first terminal (upper-left terminal in the figure) and photoelectric conversion means is connected to a second terminal (lower-left terminal in the figure) on one side of a circulator 5. An optical fiber 1 under test is connected to a terminal (right-hand terminal in the figure) on the other side. Frequency-chirped light (measurement light) emitted from the light source is incident on the optical fiber 1 under test through the circulator 5. At this point, the chirp rate of the measurement light propagating through the optical fiber 1 under test varies due to the wavelength dispersion effect of the fiber 1 under test. Reflected light from an output end (or from a reflecting mirror provided at the output end) of the optical fiber under test is emitted from the input end of the optical fiber 1 under test, and is received by the photoelectric conversion means via the circulator 5, so that a beat signal is received. The GVD value is calculated by using the beat signal received.

With the amount $\delta_{fB}$ of change in the beat frequency before and after propagation through the optical fiber 1 under test, the GVD value D is given by the following expression:

$$D = c\delta f_B / \lambda^2 L \gamma^2 \Delta T \qquad (2)$$

When the GVD value D is obtained based on expression (2), the measurement accuracy of the total amount of dispersion DL of the GVD is limited according to the reading accuracy of the beat frequency. Therefore, a light source having high chirp linearity and a wide frequency chirp range is useful for measurement.

Figure 2:
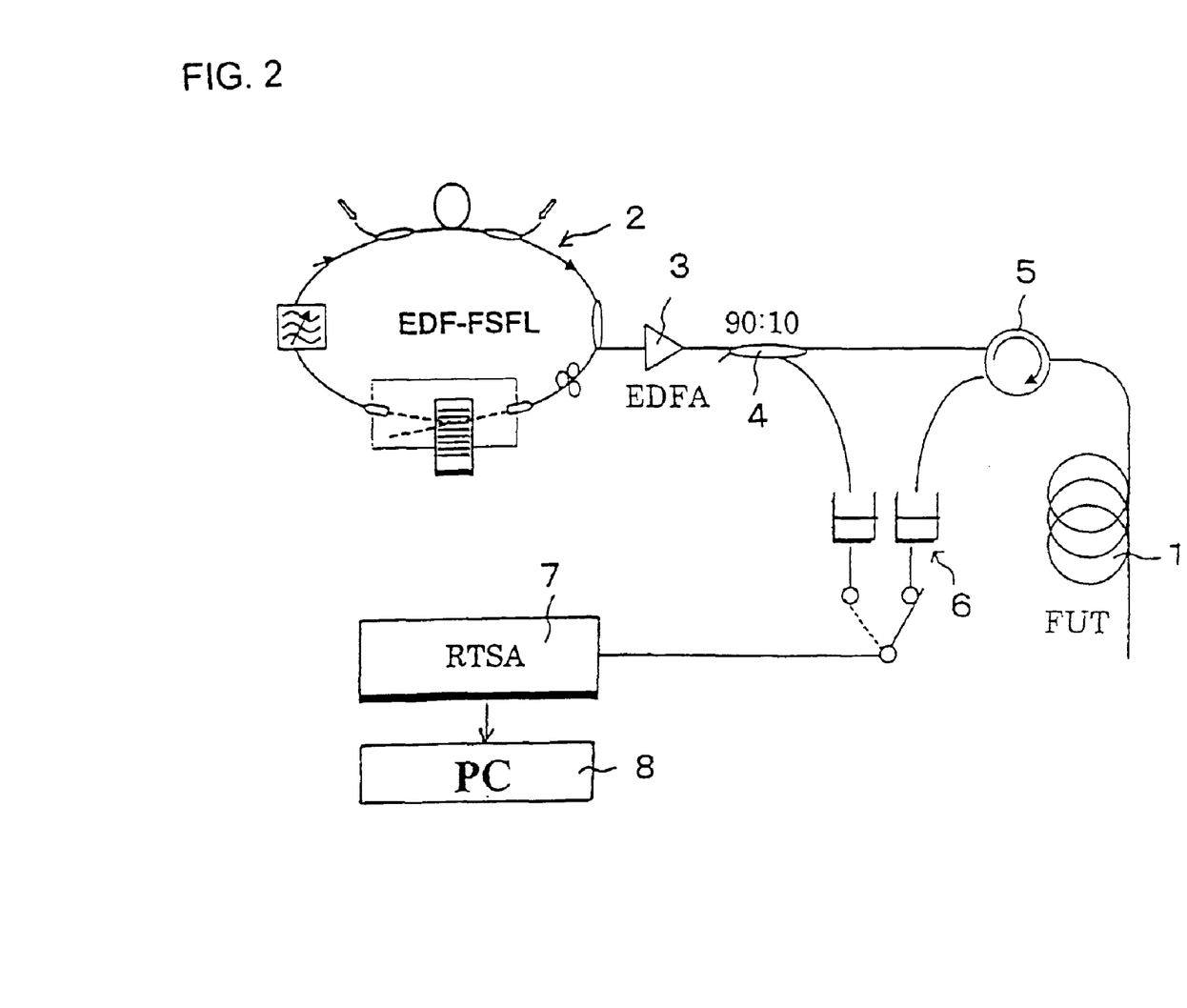
FIG. 2 is a block diagram showing the entire configuration of a group-velocity-dispersion measuring device according to a first embodiment of the present invention.

FIG. 2 is a block diagram showing the entire configuration of an embodiment of the group-velocity-dispersion measuring device according to the present invention. The group-velocity-dispersion measuring device in FIG. 2 includes an FSF laser (FSFL, serving as chirped light generating means) 2 for generating frequency-chirped light, an optical amplifier (Amp) 3 for amplifying the frequency-chirped light, an optical coupler 4, a circulator 5 for controlling optical-signal branching, an photodetector 6 for receiving light beams obtained before and after propagation through the optical fiber 1 under test, an RF spectrum analyzer (RFSA, serving as frequency-change-amount detecting means and spectrum observing means) 7 for observing optical spectral profiles, and a computer (PC, serving as center frequency detecting means) for detecting a GVD value based on the observation results of the RFSA 7. A reflecting mirror may be provided at the output end of the optical fiber 1 under test (a terminal at the opposite side of the circulator 5) or in the vicinity thereof.

The group-velocity-dispersion measuring device alternately observes beat signals generated between chirped light beams obtained before and after multiple frequency-chirped light beams emitted from the FSF laser 2 propagate through the optical fiber 1 under test (for example, an SMF having a fiber length of 20 km), and calculates the GVD value from the differences between the beat frequencies of these beat signals. The photodetector 6 and the RFSA 7 can detect the beat frequencies obtained before and after the frequency-chirped light propagates through the optical fiber 1 under test when a selector switch is provided, or when a detection signal is transmitted in a time-division manner.

Now, the FSF laser 2 for producing frequency-chirped light will be described in detail.

The FSF laser 2 shown in FIG. 2 has an acousto-optic modulator (AOM) serving as a frequency-shifting element inside a cavity, and feeds back first diffraction light frequency-shifted by the Doppler effect to generate laser light.

The inventors have theoretically and experimentally found that the instantaneous frequency component of the output from the FSF laser 2 is composed of multiple components (chirped frequency comb) which chirp with time. In such a cavity, a standing wave cannot exit, and the instantaneous frequency $v_i(t)$ is given by expression (3):

$$v_i(t) = v_0 t + \frac{v_{FS}}{\tau_{RT}}\left(t - \frac{q}{v_{FS}}\right) \qquad (3)$$

In expression (3), $\tau_{RT}$ indicates the cycle time of the cavity ($1/\tau_{RT}$ is the longitudinal-mode frequency of the cavity), $v_{FS}$ indicates the amount of frequency-shifting per cycle of the cavity, and q is an integer.

In a frequency-shifted feedback type cavity used for the FSF laser 2, the instantaneous frequency allowed at a certain moment exists in every cavity longitudinal-mode frequency ($1/\tau_{RT}$) interval, and frequency chirping is continuously applied to individual instantaneous frequency components (frequency comb components) at a rate ($\gamma = v_{FS}/\tau_{RT}$) equivalent to the amount of frequency shift per cycle of the cavity. The frequency chirp range $v_{BW}$ is limited to a certain range by the spectral profile of the gain medium, and each frequency component is frequency-chirped with its intensity being changed according to the spectral gain profile.

Figure 3:
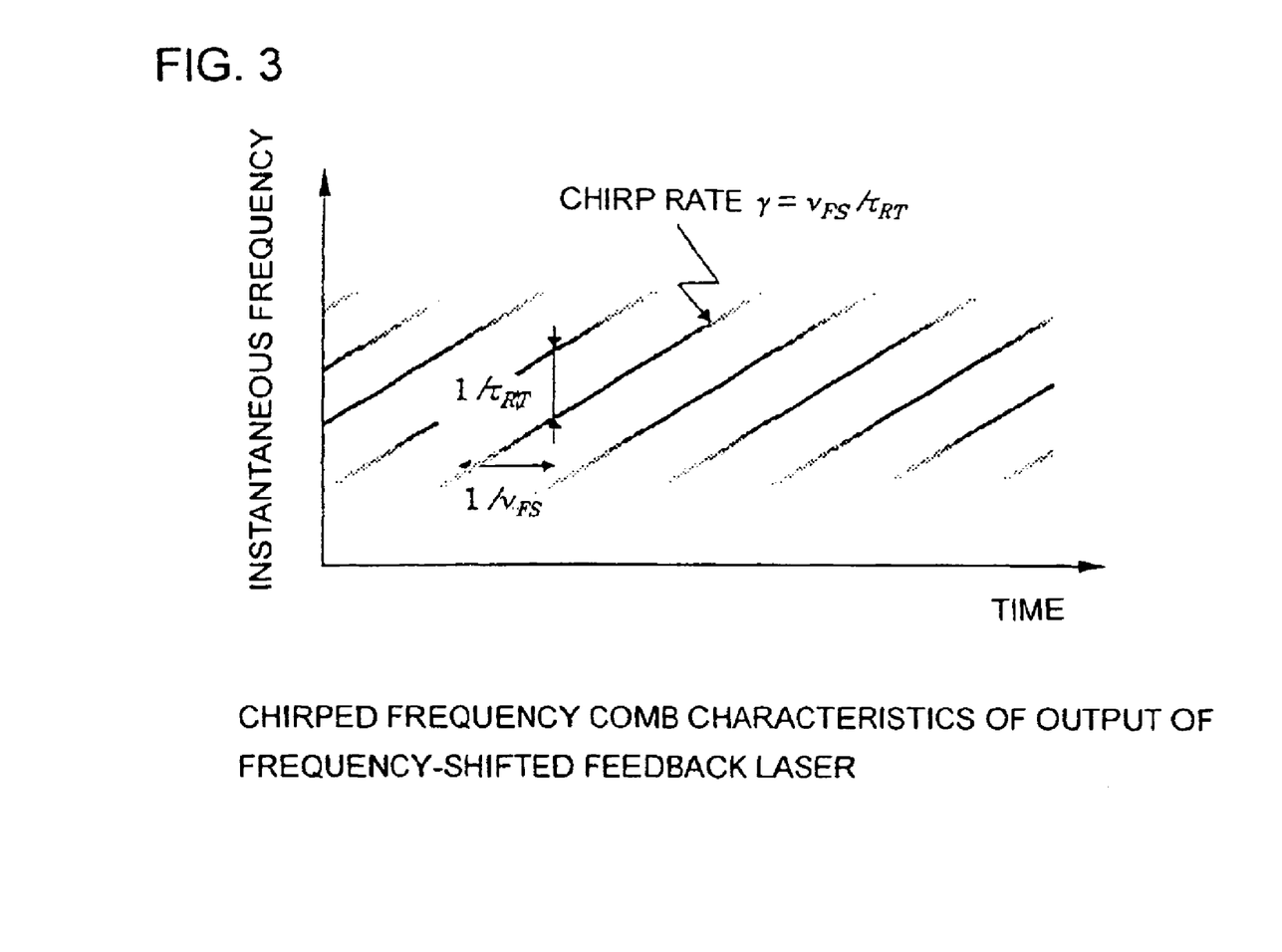
FIG. 3 is a typical view of instantaneous frequency components of an FSF laser output.

FIG. 3 is a diagram showing typical instantaneous frequency components of the output of the FSF laser 2. In the figure, gray levels show intensity changes. The chirp rate $\gamma$ is given by $v_{FS}/\tau_{RT}$.

Now, the principle of the GVD measurement using the FSF laser will be described.

The output of the FSF laser is formed of a chirped frequency comb in which chirping frequency components exist at equal time intervals $\Delta T = 1/v_{FS}$ in a comb-like manner, and a self-beat signal is generated at equal frequency intervals. When the GVD is measured with the above-described method using the beat signals, the relationship indicated by expression (2) becomes the following expression:

$$D = c\delta f_{BN} \tau_{RT}^2 / N\lambda^2 L v_{FS} \qquad (4)$$

where, $\delta f_{BN}$ indicates the change in frequency of the beat signal generated between one frequency comb component and the N-th frequency comb component therefrom, and N is defined as the beat order. Expression (4) states that, when a higher-order beat signal is used, higher measurement accuracy is obtained. The performance of the light detection system determines the measurement accuracy.

Figure 4:
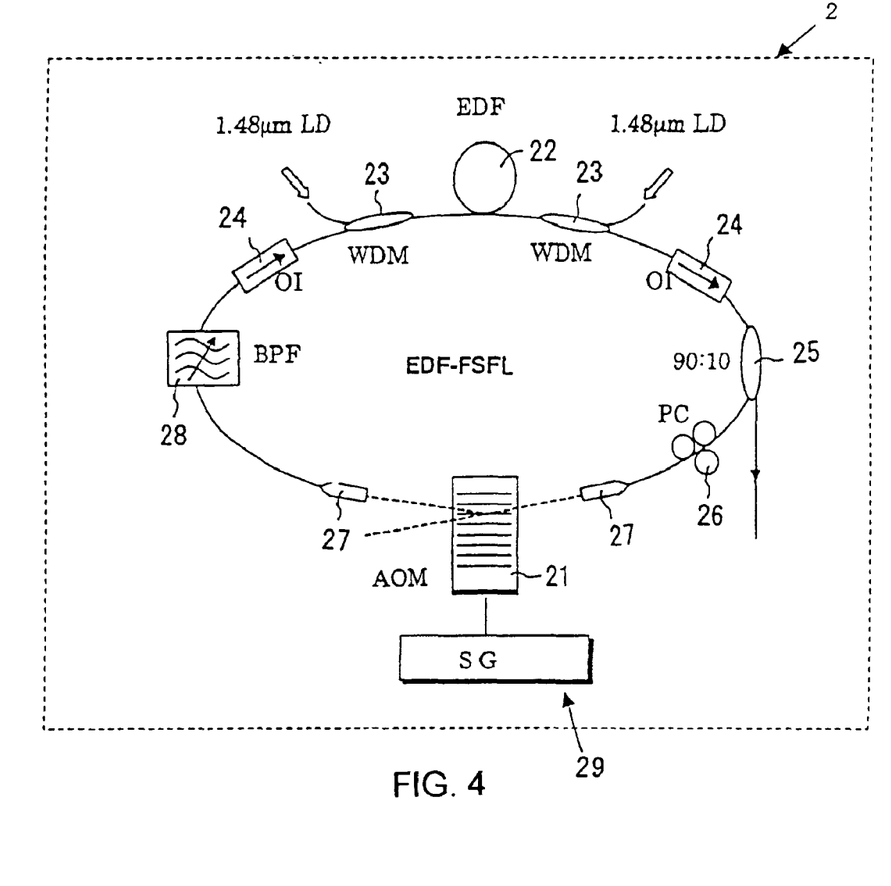
FIG. 4 is a block diagram showing a detailed structure of an FSF laser.

FIG. 4 is a block diagram showing a detailed configuration of the FSF laser 2. The FSF laser 2 is a ring-shaped laser cavity using an acousto-optic modulator (AOM, whose propagation medium is, for example, $TeO_2$) serving as a frequency-shifting element. In the laser cavity, there are provided an erbium-doped fiber (EDF, having, for example, an $Er^{3+}$-doping concentration of 900 ppm and a fiber length of 15 m) 22 having a high compatibility with the optical fiber; wavelength division multiplexing couplers (WDM) 23 on which light from semiconductor lasers (LD, having, for example, a width of 1.48 $\mu$m and a maximum excitation power of 67 mW) is incident, the lasers serving as excitation light sources; optical isolators (OI) 24; an output coupler (whose branching ratio is, for example, 90:10 (10 dB)) 25; a polarization controller (PC) 26; collimators 27; a bandpass filter (BPF) 28; and a signal generator (SG) 29 for driving the AOM 21.

The AOM 21 is inserted between the pair of collimators 27, and the optical coupling efficiency, including its diffraction efficiency, is, for example, 25%. The amount $v_{FS}$ of frequency shift per cycle of the cavity is equal to the driving frequency of the AOM 21, for example, 120 MHz, and the cavity longitudinal-mode frequency $1/\tau_{RT}$ is, for example, approximately 7.60 MHz. Thereby, the chirp rate $\gamma = v_{FS}/\tau_{RT}$ expressing the speed at which the frequency changes becomes 912 THz/s.

Figure 5:
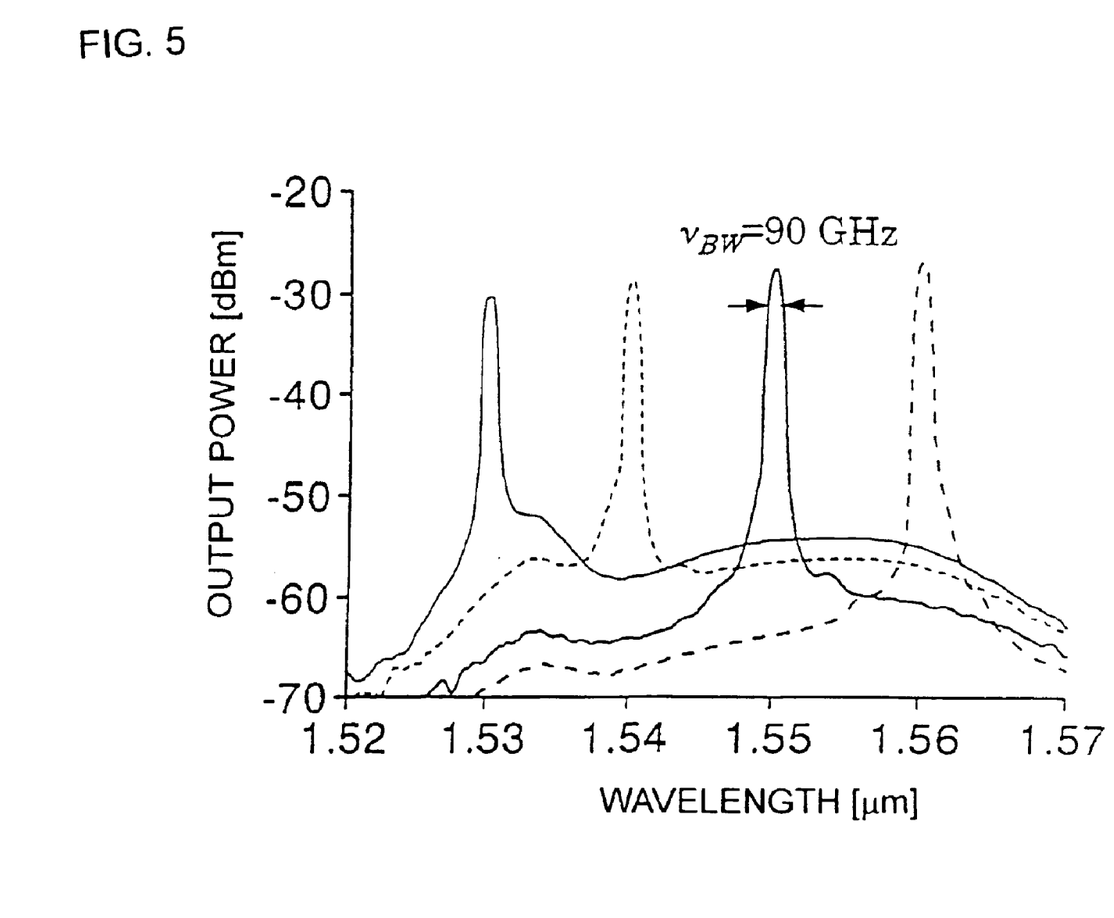
FIG. 5 is a view showing the observation results of the oscillated spectrum of the FSF laser shown in FIG. 4, made by an optical spectrum analyzer.

FIG. 5 is a diagram showing observation results of the oscillated spectrum of the FSF laser 2 shown in FIG. 4, using an optical spectrum analyzer (OSA). In this example, laser output light is composed of the chirped frequency comb components (chirped frequency comb) whose intensity changes along the spectral profile. The frequency chirp range $v_{BW}$ was 90 GHz, obtained from the full width at half maximum of the oscillated spectrum. The oscillated wavelength $\lambda$ was tuned by a BPF inserted in the cavity and a tuning range of 1530 to 1560 nm was obtained.

An acousto-optic tunable filter (AOTF) can be used instead of the AOM as a frequency-shifting element. The AOTF is a frequency-shifting element having narrow-band wavelength transmission characteristics. Since the oscillated wavelength becomes electronically tunable by using the AOTF, the BPF in the cavity is not necessary, and the configuration of the device is thus simplified.

Next, the results of the GVD measurement will be described. In the embodiment, as an example, a GVD measurement experiment was performed by using an photodetector having a bandwidth of 1 GHz, and a beat signal of order N=131 ($N/\tau_{RT}$=995.6 MHz). Since the oscillated spectrum of the laser has nearly a gaussian profile, the beat spectrum observed by the RFSA 7 was approximated to a gaussian waveform to obtain the center frequency of the beat signal. In more detail, the oscillated wavelength was tuned by the bandpass filter (BPF) 28 inserted in the laser cavity, that is, the FSF laser 2 in FIG. 4, and the GVD value in the optical communication wavelength range (for example, 1530 to 1560 nm) was measured based on expression (2), described above.

Figure 6:
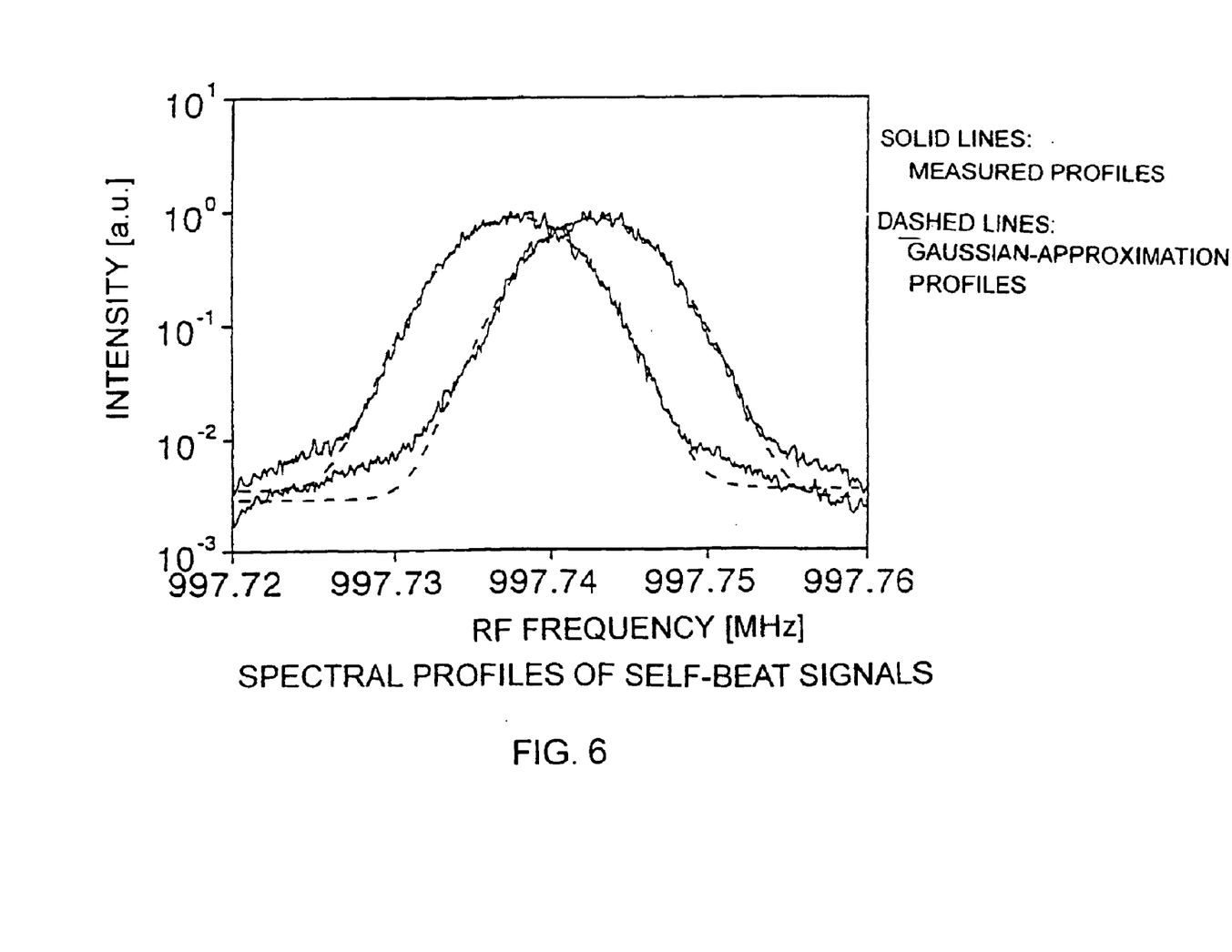
FIG. 6 is a spectral-profile view of the beat signals generated between chirped light beams obtained before and after propagation through an optical fiber under test.

FIG. 6 is a view of the spectral profiles of self-beat signals of light obtained before and after the frequency-chirped light propagates through the optical fiber 1 under test. The solid lines indicate the measured profiles, and the dashed lines indicate gaussian-approximation profiles. Here, as an example, each beat spectrum shows the average of 50 spectra, and the measuring time was 15 seconds or less. The amount $\delta f_{8131}$ of change in the center frequency obtained after the propagation in an SMF is $\delta f_{8131}$=+5.00 kHz, and by substituting this value into expression (4) (or expression (2)), the GVD value D obtained is D=17.0±0.14 ps/nm/km.

Figure 7:
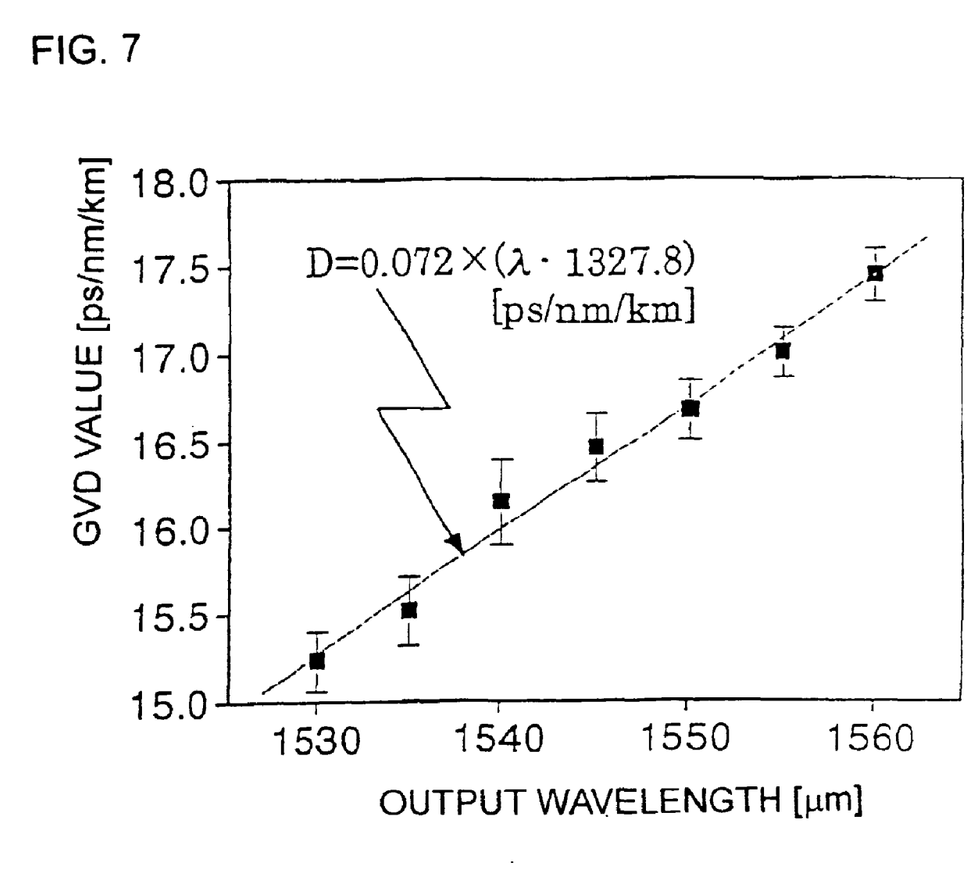
FIG. 7 is a view showing the results of GVD measurement.

FIG. 7 is a view showing the results of measuring the GVD, and indicates the relationship between the output wavelength and the GVD value. As shown in FIG. 7, the GVD value changes approximately linearly with wavelength, and this verifies the suitability of the present method. Since the EDF, serving as a gain medium, has a low gain at a wavelength of around 1540 nm, the width of the oscillated spectrum is reduced and therefore reduces the GVD measurement accuracy to some extent, but, on the whole, it does not have much influence and linearity can be observed.

Figure 8:
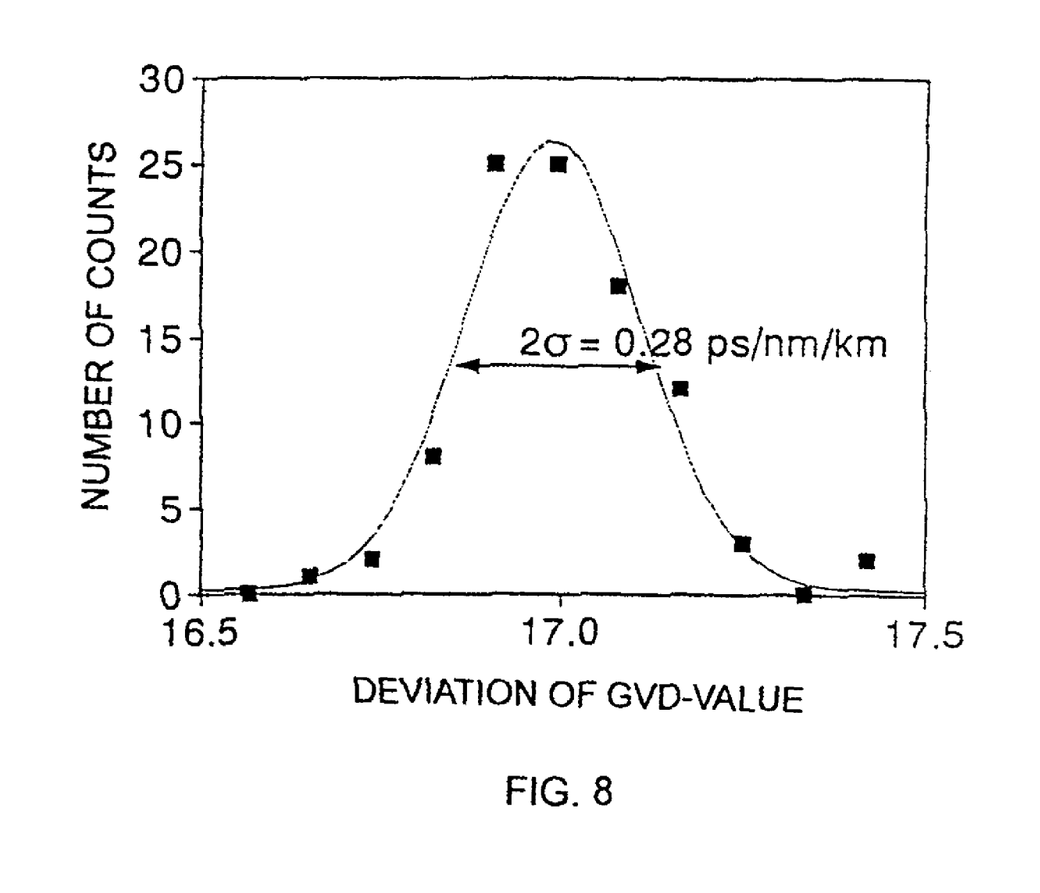
FIG. 8 is a histogram showing the results of one hundred GVD measurements.

FIG. 8 is a histogram showing the results of 100 GVD measurements. In this example, the standard variance of the measurement values is 0.14 ps/nm/km. One factor for the reduction in measurement accuracy is the reading error of the center frequency of the self-beat signal, caused by changes in the cavity length. By using a higher-order self-beat signal for measurement, the amount of variation of the center frequency due to the effect of the GVD is increased, and the measurement sensitivity improves, but at the same time, a measurement error due to the variation in the cavity length increases in some cases. As ways to improve the measurement accuracy, stabilizing the cavity length, increasing the bandwidth of the photodetector system, and simultaneously measuring the beat-signals of the light obtained before and after propagation through the optical fiber can be performed.

Next, other embodiments and modifications of the present invention will be described.

In the present invention, in order to obtain the change in frequency automatically, as the frequency-change-amount detecting means, spectrum observing means for observing the spectral profile of the beat signal, and center-frequency detecting means for detecting the center frequency of the beat signal by approximating the spectral profile observed by the spectrum observing means may be provided. In this case, the frequency-change-amount detecting means detects the amount of change in the beat frequency from the shift between the center frequencies obtained before and after the frequency-chirped light propagates through the optical fiber under test. Further, the frequency-change-amount detecting means may detect the shift between the center frequencies obtained before and after propagation of the frequency-chirped light, based on resultant spectral profiles observed multiple times by the spectrum observing means.

Figure 9:
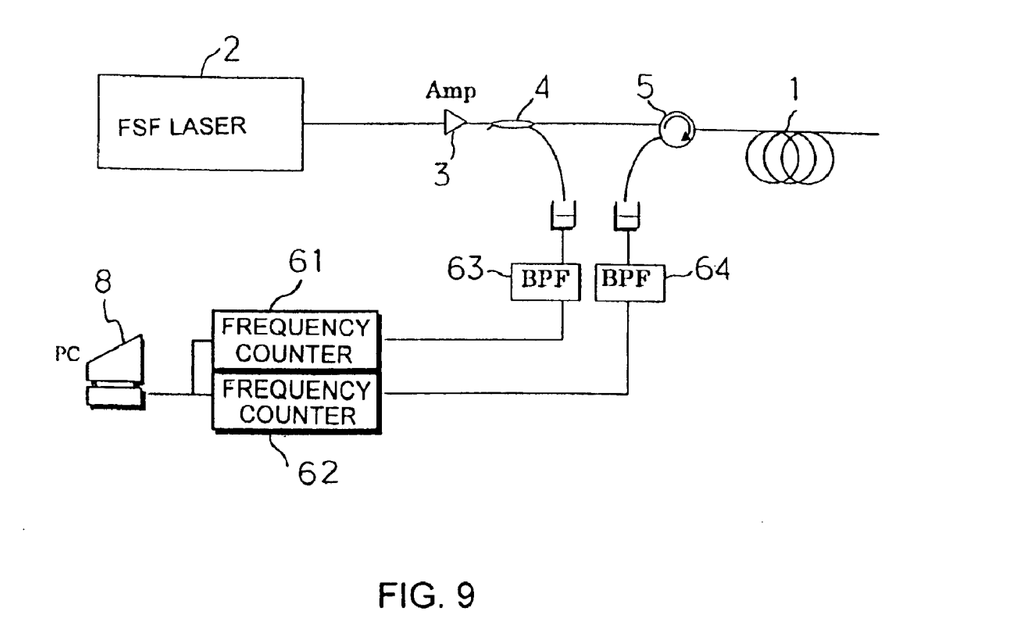
FIG. 9 is a block diagram showing the entire configuration of a group-velocity-dispersion measuring device according to a second embodiment of the present invention.

FIG. 9 is a block diagram showing the entire configuration of a group-velocity-dispersion measuring device according to a second embodiment of the present invention. Here, first and second frequency counters 61 and 62 are further provided. The first and the second frequency counters 61 and 62 measure the center frequencies of the self-beat signals of light beams obtained before and after propagation through the optical fiber under test. Thereby, the beat signals obtained before and after propagation through the optical fiber under test can be simultaneously measured. Bandpass filters 63 and 64 are provided at the input sides of the frequency counters 61 and 62, respectively, so that only desired signals are input. A computer (PC) 8 for detecting the GVD value according to the measurement results of the beat frequencies by the frequency counters 61 and 62 is provided.

Chirped light generating means according to other embodiments will be described below. These chirped light generating means have configurations which can be substituted for the FSF laser 2 in the measuring device described above.

Figure 10:
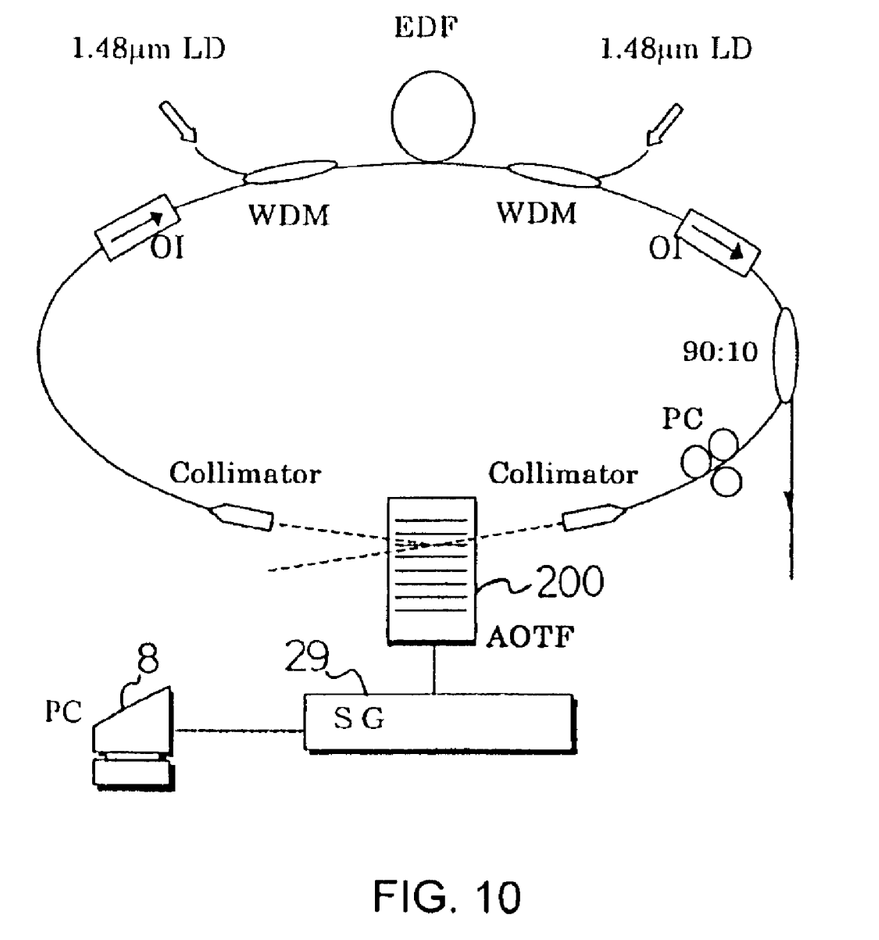
FIG. 10 is a view showing a structural view of chirped light generating means according to a second embodiment.

FIG. 10 is a structural view of chirped light generating means according to a second embodiment. An acousto-optic tunable filter (AOTF) 200 is used as the frequency-shifting element shown in FIG. 4, and the BPF 28 is omitted. The oscillated wavelength can be electronically controlled when the PC 8 controls the signal generator 29 serving as a driving signal source.

Figure 11:
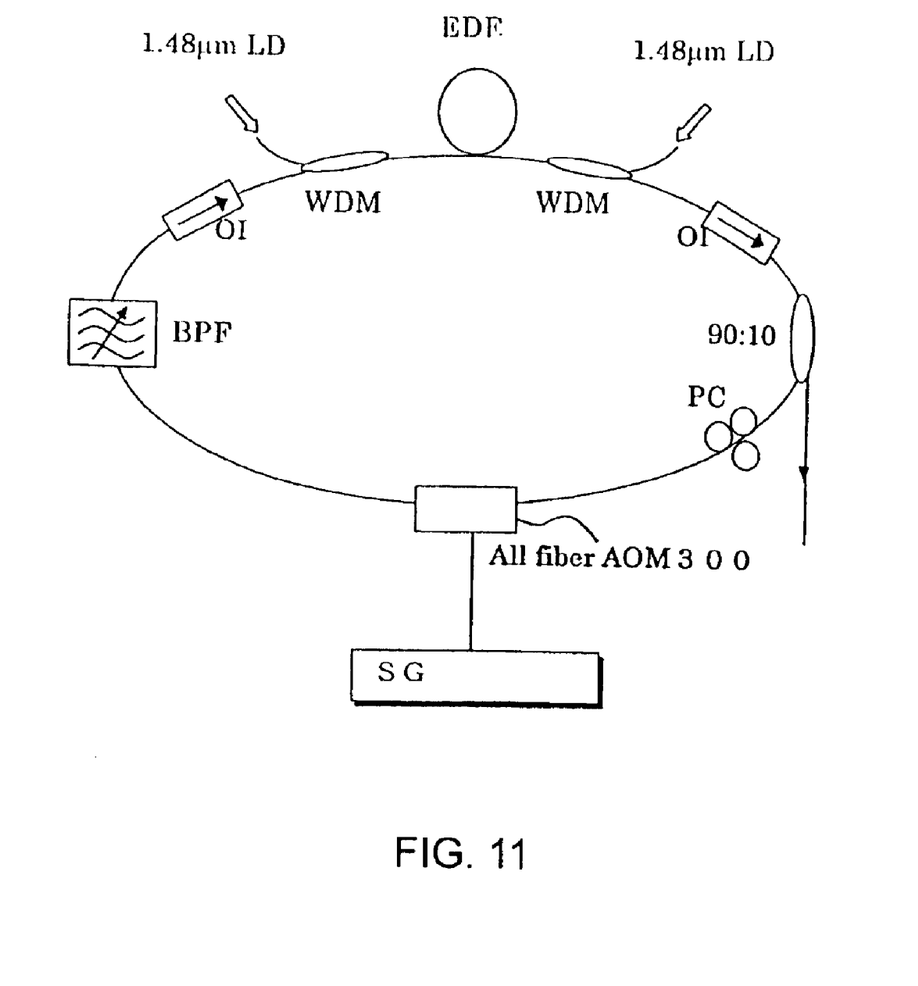
FIG. 11 is a view showing a structural view of chirped light generating means according to a third embodiment.

FIG. 11 is a structural view of chirped light generating means according to a third embodiment. An all-fiber acousto-optic modulator (all-fiber AOM) 300 using an optical fiber as a medium is used as the frequency-shifting element shown in FIG. 4, and the collimators 27 are omitted, so that the measuring device can have an all-fiber configuration.

Figure 12:
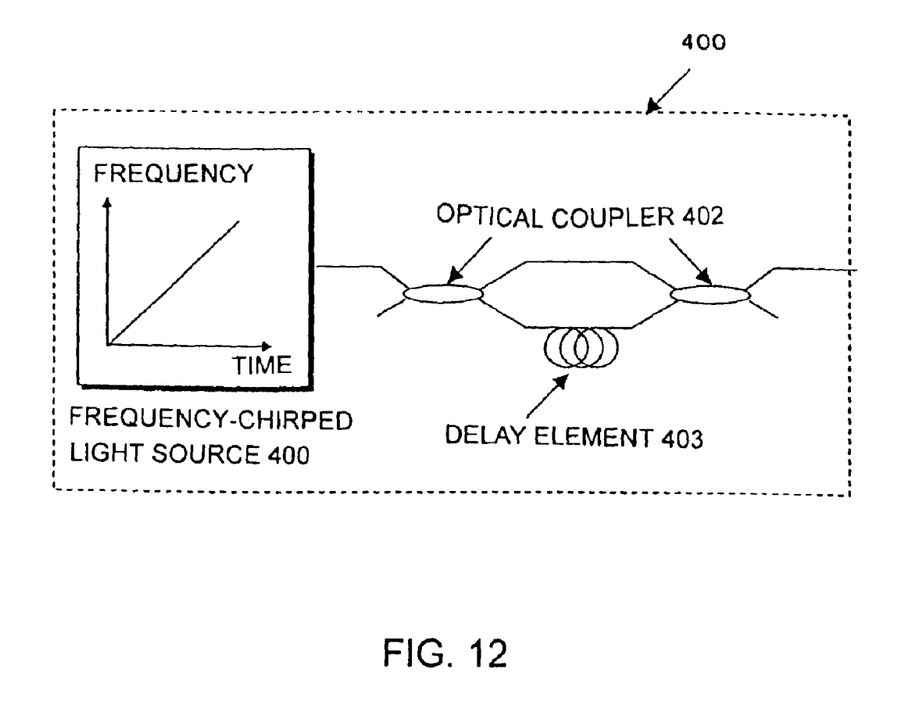
FIG. 12 is a view showing a structural view of chirped light generating means according to a fourth embodiment.

FIG. 12 is a structural view of chirped light generating means according to a fourth embodiment.

Chirped light generating means 400 includes a frequency-chirped light source 401 whose oscillated frequency shifts with time, and an optical-branching coupler 402 for branching light emitted from the frequency-chirped light source 401, applying a delay 403 to one light beam, and coupling that light beam with the other light beam. With such a configuration, at least two frequency-chirped light beams can be generated.

Note that, any appropriate light source whose oscillated frequency shifts with time can be employed as the frequency-chirped light source. Further, instead of measurement being performed at the input side of the optical fiber under test 1, as described above, a measurement system may be provided at the output side.

INDUSTRIAL APPLICABILITY

As described above in detail, according to the present invention, a group-velocity-dispersion measuring device and a group-velocity-dispersion measuring method which can measure the GVD with a simple configuration within a short time are provided. In other words, according to the present invention, a GVD value is calculated from the difference in frequency of beat signals generated between multiple frequency-chirped light beams at equal frequency intervals, obtained before and after propagation through the optical fiber under test, so that the GVD value can be measured in a short time, compared with a conventional method in which measurement is performed at many points by using the wavelength of a measurement light source as a parameter.

Since the OFDR method is used for measurement, measurement at an input end of the optical fiber under test is possible and can be easily applied to existing optical transmission networks. Further, according to the present invention, by stabilizing the laser cavity length, and increasing the frequency chirp range, the measurement accuracy is improved.

What is claimed is:

1. A group-velocity-dispersion measuring device comprising:

chirped light generating means for generating at least two frequency-chirped light beams at a predetermined frequency interval, or a plurality of frequency-chirped light beams at equal frequency intervals;

frequency-change-amount detecting means for detecting the frequency-change-amount of beat signals generated between chirped light beams obtained before and after the frequency-chirped light beams generated by the chirped light generating means propagate through an optical fiber under test; and group-velocity-dispersion detecting means for detecting the group-velocity-dispersion value of the optical fiber under test based on the amount of change detected by the frequency-change-amount detecting means.

2. A group-velocity-dispersion measuring device according to claim 1 characterized in that:

the chirped light generating means has a frequency-shifting element for shifting the frequency, and feeds back frequency-shifted diffraction light to generate the frequency-chirped light beams.

3. A group-velocity-dispersion measuring device according to claim 1 wherein:

the chirped light generating means has a ring cavity in which a gain medium, an excitation light source, an optical coupler, and a frequency-shifting element are connected in a ring shape.

4. A group-velocity-dispersion measuring device according to claim 3 wherein:

the chirped light generating means further comprises a band-bass filter to tune the oscillated wavelengths of the frequency-chirped light beams.

5. A group-velocity-dispersion measuring device according to claim 3 wherein:

the chirped light generating means uses an acousto-optic tunable filter as the frequency-shifting element, and tunes the oscillated wavelength using the driving frequency of the filter.

6. A group-velocity-dispersion measuring device according to claim 3 wherein:

the chirped light generating means uses an all-fiber acousto-optic modulator using an optical fiber as a medium as the frequency-shifting element to allow the measuring device to have an all-fiber configuration.

7. A group-velocity-dispersion measuring device according to claim 1 wherein:

the chirped light generating means generates the frequency-chirped light whose frequency varies at a rate equal to the frequency shift amount which the frequency-shifting element applies to an optical wave in the ring cavity per cycle of the cavity.

8. A group-velocity-dispersion measuring device according to claim 1 characterized in that:

the chirped light generating means comprises:

a frequency-chirped light source whose oscillated frequency is shifted with time; and an optical-branching coupler for branching light emitted from the frequency-chirped light source, applying a delay to one light beam, and coupling the one light beam with the other light beam, to generate at least two frequency-chirped light beams.

9. A group-velocity-dispersion measuring device according to claim 1 wherein:

the frequency-change-amount detecting means comprises spectrum observing means for observing the spectral profile of a beat signal; and center-frequency detecting means for detecting the center frequency of the beat signal by approximating the spectral profile observed by the spectrum observing means, and the frequency-change-amount detecting means detects the amount of change of the beat frequency from the shift between the center frequencies obtained before and after the frequency-chirped light propagates through the optical fiber under test.

10. A group-velocity-dispersion measuring device according to claim 1 wherein:

the frequency-change-amount detecting means comprises:

first detecting means for detecting a beat frequency obtained before the frequency-chirped light propagates;

second detecting means for detecting a beat frequency obtained after the frequency-chirped light propagates; and switching means for switching between the first and second detecting means, and detects the shift between center frequencies obtained before and after the frequency-chirped light propagates, by switching with the switching means.

11. A group-velocity-dispersion measuring device according to claim 1 wherein:

the frequency-change-amount detecting means comprises first and second frequency counters for measuring the center frequencies of self-beat signals of light beams obtained before propagation and after propagation through the optical fiber under test.

12. A group-velocity-dispersion measuring method comprising:

a step of generating at least two frequency-chirped light beams at a predetermined frequency interval, or a plurality of frequency-chirped light beams at equal frequency intervals;

a step of propagating the frequency-chirped light beams, generated in the step of generating, through an optical fiber under test;

a step of detecting the amount of frequency change of the beat signals generated between chirped light beams obtained before and after propagation; and a step of detecting the group-velocity-dispersion value of the optical fiber under test based on the detected amount of change.

13. A group-velocity-dispersion measuring method according to claim 12 characterized in that:

the step of detecting detects the amount of change of the beat frequencies generated between adjacent frequency components or frequency components that are further apart.

* * * * *